United States Patent
Maier et al.

(10) Patent No.: US 8,465,374 B2
(45) Date of Patent: Jun. 18, 2013

(54) DAMPING SYSTEM AND METHOD FOR ELIMINATING TORSION VIBRATIONS

(75) Inventors: Carl Udo Maier, Stuttgart (DE); Jochen Ostermaier, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 18 days.

(21) Appl. No.: 13/148,488

(22) PCT Filed: Jan. 5, 2010

(86) PCT No.: PCT/EP2010/050041
§ 371 (c)(1),
(2), (4) Date: Aug. 9, 2011

(87) PCT Pub. No.: WO2010/091904
PCT Pub. Date: Aug. 19, 2010

(65) Prior Publication Data
US 2011/0319177 A1   Dec. 29, 2011

(30) Foreign Application Priority Data
Feb. 10, 2009 (DE) .......................... 10 2009 008 075

(51) Int. Cl.
*F16F 15/18* (2006.01)
*F16C 3/02* (2006.01)

(52) U.S. Cl.
USPC .......................................... 464/180; 700/280

(58) Field of Classification Search
USPC ..................... 464/23, 180, 183; 700/279, 280
See application file for complete search history.

(56) References Cited

U.S. PATENT DOCUMENTS

| 6,012,333 | A | 1/2000 | Hontani et al. |
| 6,102,144 | A * | 8/2000 | Lutz |
| 6,520,678 | B2 * | 2/2003 | Aiken et al. |
| 6,606,922 | B2 * | 8/2003 | Case et al. ..................... 464/180 |
| 6,889,803 | B2 * | 5/2005 | Schankin et al. ......... 464/180 X |
| 2004/0069092 | A1 | 4/2004 | Ranek et al. |
| 2008/0110293 | A1 | 5/2008 | Clausin |

FOREIGN PATENT DOCUMENTS

| DE | 19721298 A1 | 11/1998 |
| DE | 10052697 A1 | 6/2001 |
| DE | 10355624 A1 * | 7/2005 |
| DE | 102006062126 A1 | 7/2008 |
| JP | 2001145850 A | 5/2001 |
| JP | 2002327659 A | 11/2002 |
| JP | 2006136443 A | 6/2006 |
| WO | WO 9703832 A1 | 2/1997 |

* cited by examiner

*Primary Examiner* — Gregory Binda
*Assistant Examiner* — Josh Skroupa

(57) ABSTRACT

A damping system for damping torsion vibrations of shafts in machines is provided. A torque sensor detects torsion vibrations. A magnetostrictive actuator device creates a mechanical counter-vibration and a control device registers a measurement signal of the torque sensor in a time-resolved manner and creates a phase-shifted signal for a counter-vibration and drives the actuator device. Further, a method for eliminating torsion vibration of shafts in machines with such a damping system is provided. The torsion vibration of the torque of the shaft is registered in a time-resolved manner, a phase-shifted signal is created for a counter-vibration, and a mechanical counter-vibration is created using at a magnetostrictive actuator device.

14 Claims, 3 Drawing Sheets

DAMPING SYSTEM AND METHOD FOR ELIMINATING TORSION VIBRATIONS

CROSS REFERENCE TO RELATED APPLICATIONS

This application is the US National Stage of International Application No. PCT/EP2010/050041 filed Jan. 5, 2010, and claims the benefit thereof. The International Application claims the benefits of German Patent Application No. 10 2009 008 075.9 DE filed Feb. 10, 2009. All of the applications are incorporated by reference herein in their entirety.

FIELD OF INVENTION

The invention relates to a damping system for eliminating torsion vibrations and to a method for eliminating the torsion vibrations.

BACKGROUND OF INVENTION

As a result of the inherent frequencies and resonance effects undesired torsion vibrations can arise on shafts of force conversion machines, which cause a humming sound or cause wear or in the worst case the failure of the component or of the components coupled in respect of vibrations to the shaft. Previously torsion vibrations have been able to be damped or avoided by dual-mass systems attached to the shafts by changing the inherent frequency of the system. There are likewise systems which damp out torsion vibrations by means of belts via a secondary unit having a belt pulley and a compensation mass. In this method the torsion vibrations are damped using mechanical effects, with the additional masses and mechanisms increasing the weight of machines and their complexity. If the inherent frequency of the system is changed in a rotating mechanical system by switching part mechanisms on or off, the coupled mechanical damping system must also be adapted to this change, further increasing the complexity of the system.

SUMMARY OF INVENTION

An object of the present invention includes specifying means and methods for rectifying torsion vibrations and the disruptive effects that they cause, especially generation of noise and/or vibrations. It is also to be possible to use simple means to adapt to changed vibration conditions.

To begin with, the known physically inverse effects of magnetostriction and magnetoelasticity will be explained, since they are used in the invention.

Magnetostriction is physically a deformation of ferromagnetic materials as a result of an applied magnetic field. In such cases the body typically experiences an elastic change in length for a constant volume. If an external magnetic field is applied to a ferromagnet, the so-called Weiss domains are aligned in the same direction. Turning the dipole changes the length of a rod in the range of around 10 to 30 μm/m (highly magnetostrictive materials up to 2 mm/m). A ferromagnet is excited by a magnetic alternating field into mechanical vibrations.

With the magnetoelastic effect, in an inverse manner to magnetostriction, the alignment of the Weiss domains occurs through a mechanical force effect on a ferromagnetic material as a result of which these regions cause an externally changed permeability which is typically able to be measured by a magnetic coupling to a coil.

A damping system for damping the torsion vibrations of shafts in force-converting machines is proposed especially in accordance with a first technical hardware aspect of the present invention which, for achieving the object of the invention is equipped with the following means:

a torque sensor for detecting the torsion vibration;

at least one magnetostrictive actuator device for generating a mechanical counter-vibration;

a control means which detects the measurement signal of the torque sensor resolved over time and can generate a phase-shifted signal for a counter-vibration and drive the actuator device.

The magnetostrictive actuator device preferably has at least one first electromagnetic coil which is arranged on a holder device preferably surrounding the shaft.

In accordance with a preferred embodiment of the present invention the holder device is anchored on the housing of the machine. This will impose greater demands on the rotational precision of the shaft however so that the gap distances between actuator device and shaft and torque sensor and shaft are not subject to any fluctuations that are too great.

Thus the holder device, in a further developed embodiment is arranged with the housing of the machine in a holder device coupled to the axial oscillating movement of the shaft caused by unbalance and/or rotational imprecision and/or bearing tolerances and/or torsion, so that a preset gap distance is always maintained during the rotation of the shaft. The holder device thus follows the vibration movements of the shaft.

It is further advantageous for the effective direction of the at least one actuator device to be arranged in relation to the axis of rotation of the shaft with a preset angle of inclination, so that the effective direction of the actuator device matches the direction of the torsion stresses in the surface areas of the shaft as well as possible.

The angle of inclination of the effective direction of a first actuator device preferably lies between 30 and 60 degrees, preferably between 40 and 50 degrees, more preferably between 43 and 47 degrees, even more preferably at 45 degrees, and the angle of inclination of the effective direction of a second actuator device preferably lies between 255 and 285 degrees, more preferably between 265 and 275 degrees, even more preferably between 268 and 272 degrees, even more preferably at 270 degrees in relation to the shaft's axis of rotation.

The at least one magnetostrictive actuator device is preferably embodied as an electromagnetic coil which is arranged in a holder device surrounding the shaft. The magnetostrictive actuator devices further preferably each feature a plurality of electromagnetic coils, which are preferably arranged all around them.

In a further preferred embodiment of the present invention the torque sensor and the least one electromagnetic coil are arranged in a common holder device or each in a separate holder device surrounding the shaft. This makes greater flexibility possible in relation to the application-related requirements.

This flexibility can further be increased if a plurality of holder devices surrounding the shaft is designed to generate a multiply-amplified and coordinated counter-vibration.

Because the magnetostrictive effect does not possess any great effective depth, it can be of particular advantage to use the inventive damping system when the shaft is embodied because of application as a hollow shaft.

The control means also preferably features a control algorithm which generates the eliminating damping in an open or closed-loop control circuit.

The at least one magnetostrictive actuator device is spaced away from the surface of the shaft with a predetermined gap. This enables the inventive damping to be carried out without contact and thus without wear through friction.

Furthermore, in a further preferred embodiment, the at least one magnetostrictive actuator device is spaced from the neighboring actuator device by a predetermined distance, so that the actuator devices do not have a disruptive influence on each other.

The at least one magnetostrictive actuator device preferably features at least a first and a second electromagnetic coil, which are intended in each case for one of the two opposing directions of rotation or directions of vibration of the shaft, with the directions in which the first and second actuator devices act being embodied substantially at right angles to each other.

In a further preferred embodiment of the present invention the first and the second electromagnetic coil of the actuator devices acting in a complementary manner to each other are arranged crossed above one another.

The torque sensor in this case is preferably embodied according to the magnetoelastic principle, the inverse effect to the magnetostrictive effect, but can however be of any other known design.

According to yet another process technology aspect in this case the object of the invention is achieved by a method for damping torsion vibrations of shafts in machines with a damping system according to one of the previously described embodiments.

To this end the following method steps are carried out:
the torsion vibration of the torque of the shaft is detected in a time-resolved manner;
a phase-shifted signal for a counter-vibration is generated, and
a mechanical counter-vibration is generated with the aid of at least one magnetostrictive actuator device.

An especially effective damping is achieved by the first actuator device having power applied to it during the vibration maximum of the torsion vibration of the torque and the second actuator device having power applied to it during the vibration minimum. The result achieved by this is that the damping counter vibration generated is adapted in each case to the direction of the torsion vibrations which change their direction once per torsion vibration.

With the inventive method the torsion vibrations can be largely extinguished, so that for example a disruptive generation of noise and also a disruptive vibration can be eliminated. It is also possible to damp torsion vibrations or vibrations inventively in stationary shaft systems.

BRIEF DESCRIPTION OF THE DRAWINGS

The invention will be explained below in exemplary embodiments which refer to the associated drawings, in which.

DETAILED DESCRIPTION OF INVENTION

Figure 1:
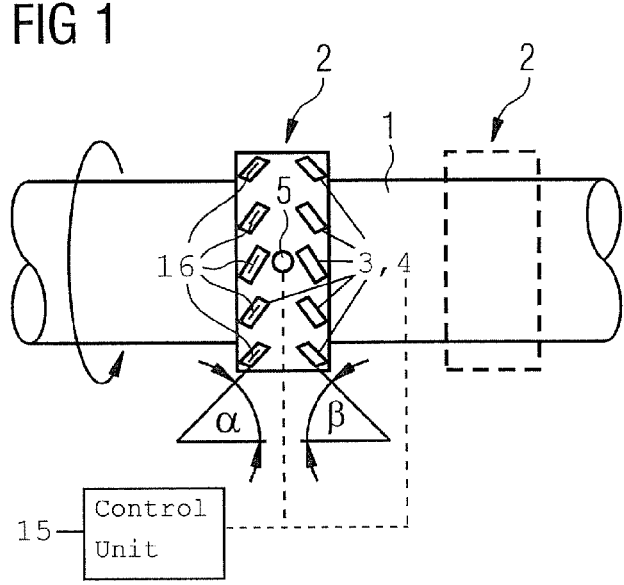
FIG. 1 shows a first preferred embodiment of the inventive damping system.

FIG. 1 shows a first preferred embodiment of the inventive damping system 11.

A shaft 1, supported rotatably in bearings 6 (see FIG. 6) of a force-converting machine, is subject to torsion vibrations which are especially evident in the surface regions. The frequency of this torsion vibration is produced by the inherent frequency of the mechanical system.

Inventively a holder device 2 surrounding the shaft 1 is especially embodied in the shape of a ring. In the present embodiment a torque sensor 5 and a plurality of magnetostrictive first and second actuator devices 3 and 4 are arranged in a ring around the circumference of the shaft on the inner side of the holder device 2 facing towards the surface of the shaft.

The first actuator devices 3, each comprising an electromagnetic coil 16 are arranged at a first angle of inclination α in relation to the axis of rotation of the shaft 1 such that its electromagnetically created force effect essentially matches the torsion vibrations in relation to the axis of rotation of the shaft 1 running at 45 degrees. Therefore the first angle of inclination is preferably 45 degrees, but can also lie between 30 and 50 degrees.

The second actuator devices 4 are provided for another direction of rotation or direction of vibration of the shaft 1 and are thus arranged at a second angle of inclination β embodied to complement the first angle.

The torque sensor is preferably also arranged on the inner side in the same holder device 2 and is coupled to the surface of the shaft in a non-contact electromagnetic manner It is especially advantageous for this torque sensor to be embodied in accordance with the magnetoelastic principle inverse to the magnetostrictive principle.

The measurement signal of the torsion vibration detected offset in time by the torque sensor 5 is used by a controller 15 to generate a phase-opposed control signal offset by 180 degrees to generate a counter-vibration $dM_D$. The phase-opposed control signal is then amplified by the controller 15 and is output to control the first or the second actuator device 3 or 4, depending on the torsion vibration direction of the shaft 1.

A plurality of inventive holder devices 2, 2' with magnetostrictive actuator devices can be arranged on a shaft 1, in order to generate a larger force effect of the counter-vibration.

In other embodiments (not shown) the actuator devices 3, 4 and the torque sensor 5 are arranged on separate holder devices. Furthermore just a plurality of the first actuator devices 3 can be arranged on a holder device 2. In the latter case an identical holder device 2 with actuator devices 3 can be arranged reversed on the shaft 1, so that both torsion vibration directions of the shaft 1 can be covered by a single embodiment, in which one holder device is mounted turning to the left and a second identical device is mounted turning to the right on the shaft 1.

In one embodiment the holder device 2 can be connected rigidly to the housing (not shown) of the machine and can be arranged spaced by a preset gap distance from the surface of the shaft 1. It is even more advantageous however, in a further developed embodiment, to arrange the holder device 2 "floating" or flexibly in relation to the housing 8 of the machine (see FIG. 5), so that the holder device 2 simply follows all oscillating movements of the shaft 1 as a result of rotational imperfections, bearing play, bending or torsion of the shaft. In this case both the preset gap distance of the torque sensor 5 and also the present gap distance of the magnetostrictive actuator devices 3, 4 are always maintained and consequently the measurements and the controlled damping of the torsion vibrations are more precise and more effective.

The holder device 2 is preferable embodied from two bearing shells (not shown) which make it possible to assemble and dismantle the holder device through a releasable screw connection.

Figure 2:
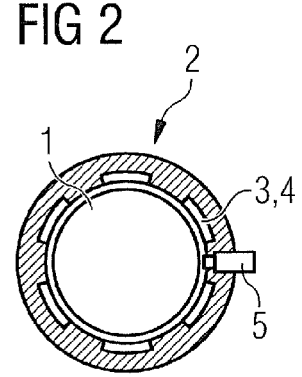
FIG. 2 shows a cross-section through the damping system.

FIG. 2 shows a cross section through the damping system from FIG. 1. In particular it can be seen that the magnetostrictive actuator devices 3, 4 are arranged on the inner side of the holder device 2 in a ring around the circumference of the shaft 1 and are spaced at a preset gap distance from the shaft surface, so that no contact and thereby no friction and wear occurs.

The magnetostrictive actuator devices 3 and 4 are preferably each spaced sufficiently from one another so that they do not exert any mutually-disruptive influences on each other.

Each of the activated actuator devices 3 or 4 generates a magnetic alternating field, which penetrates via the predetermined distance gap into the areas close to the surface of the shaft 1 and takes care of the alignment of the dipoles of the Weiss domains. The Weiss domains aligned in one direction bring about a change in length of the area of the shaft close to the surface and do so in both directions from the area involved. The counter vibration $dM_D$ generated thus propagates along the angle of inclination α or β around the shaft 1 as a torsion vibration, which is in the opposite direction to the torsion vibration generated by the torsion stresses and is phase-opposed by 180 degrees.

The amplitude and the frequency of the counter vibration $dM_D$ is able to be regulated or controlled by regulating the magnetic field strength of the actuator device/devices 3 and/or 4 in an open or closed control loop in accordance with a control algorithm proportional to the detected torsion vibration $dM_A$, so that high efficiency is able to be achieved in damping the torsion vibrations with the damping system and method.

In addition the torque sensor 5 is preferably arranged over an area of the shaft in which no actuator device 3, 4 is acting on the shaft 1, so that the torque sensor 5 does not detect any corrupted signal through the effect of the actuator devices 3, 4.

Figure 3:
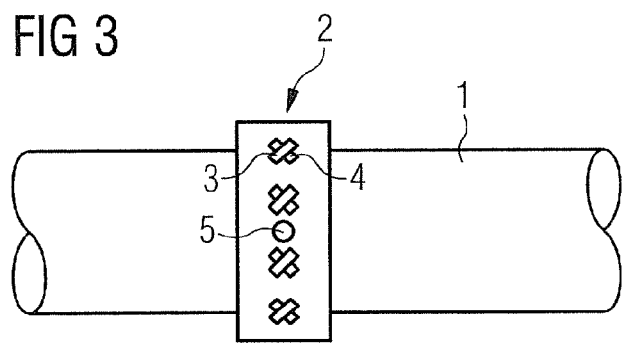
FIG. 3 shows a second preferred embodiment of the inventive damping system.

FIG. 3 shows a second preferred embodiment of the inventive damping system.

By contrast with the embodiment in FIG. 1 the magnetostrictive actuator devices 3 and 4 acting against each other are arranged here crossed above one another. They do not disturb each other since they are never activated at the same time, but each type of group is activated for a respective torsion vibration direction of rotation of the shaft 1. The actuator devices 3 and 4 in themselves remain spaced apart sufficiently from one another and thus do not exert any disruptive influence on the function of neighboring actuator devices 3 or 4.

The result of this crossed or overlapping arrangement of the actuator devices 3 and 4 is particularly a more compact design as regards length of the holder device 2, which is advantageous for a few applications because of space restrictions.

Figure 4:
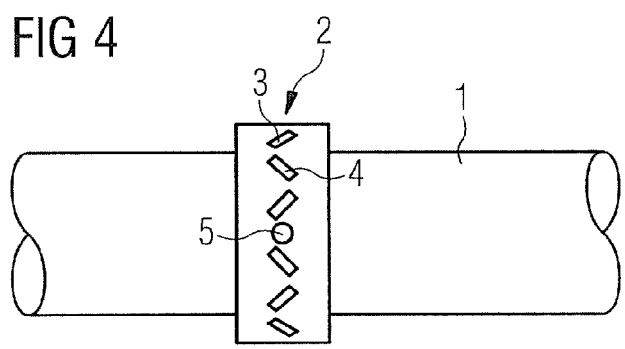
FIG. 4 shows a third preferred embodiment of the inventive damping system.

FIG. 4 shows a third preferred embodiment of the inventive damping system.

In this embodiment a design of holder device 2 which is also more compact in length is achieved, however the actuator devices 3 and 4 acting in a complementary manner are in this case arranged not above one another but next to one another along a circumferential line.

Figure 5:
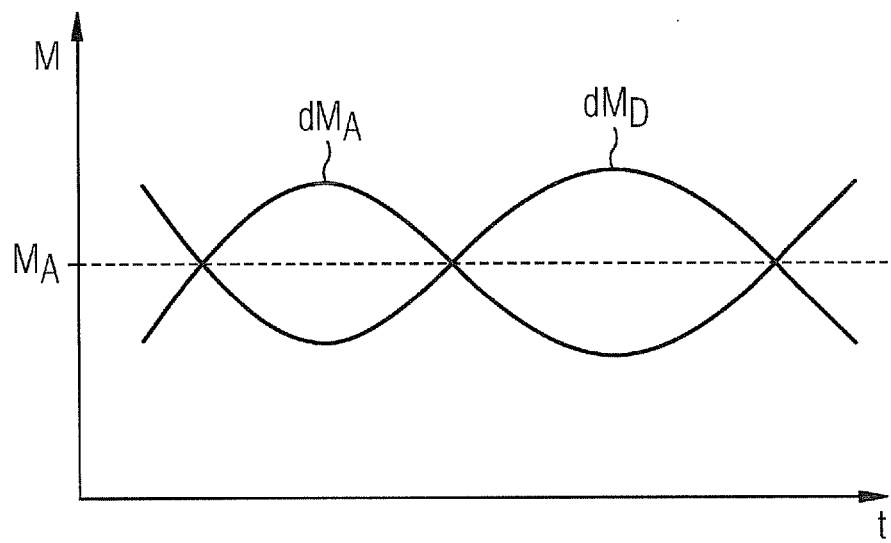
FIG. 5 shows a graph of the signals and torque.

FIG. 5 shows a time-resolved signal and a torque graph.

A drive torque $M_A$ assumed to be constant is overlaid on a torsion vibration $dM_A$. An inventively precisely phase-displaced generated counter-vibration $dM_D$ is also overlaid so that the torsion vibration $dM_A$ will be extinguished in the ideal case by the counter vibration $dM_D$. The torsion vibration is preferably detected in addition to time resolution also in amplitude, so that the amplitude of the counter-vibration is also able to be controlled and is executed with an adapted quantity.

The vibration $dM_A$ is represented by a sinusoidal vibration which has an assumed constant half vibration above the drive torque $M_A$ with vibration maximum $dM_{Amax}$, and a half vibration below the drive torque $M_A$ with vibration minimum $dM_{Amin}$.

The torsion stresses run during the vibration maximum $dM_{Amax}$, and vibration minimum $dM_{Amin}$ in the respective other direction inclined to the shaft axis with the respective angles of inclination α and β, as shown in FIG. 1. A reverse in the direction of rotation of the torsion stresses takes place. Therefore during the vibration maximum $dM_{Amax}$, of the torsion vibration, in accordance with the invention, only the coils of the first magnetoelastic actuator device 3 and during the vibration minimum $dM_{Amin}$ of the torsion vibration only the coils of the second magnetoelastic actuator devices 4 are supplied with power.

The signal of the counter vibration $dM_D$ is thus distributed to the first and second actuator devices 3 and 4. This signal distribution is preferably to be undertaken symmetrically, i.e. at the zero crossing of the sinusoidal vibration.

The preferred arrangement with the first and second actuator devices 3 and 4 arranged in a complementary manner to each other is thus twice as effective as an arrangement with only one of the two actuator devices.

Figure 6:
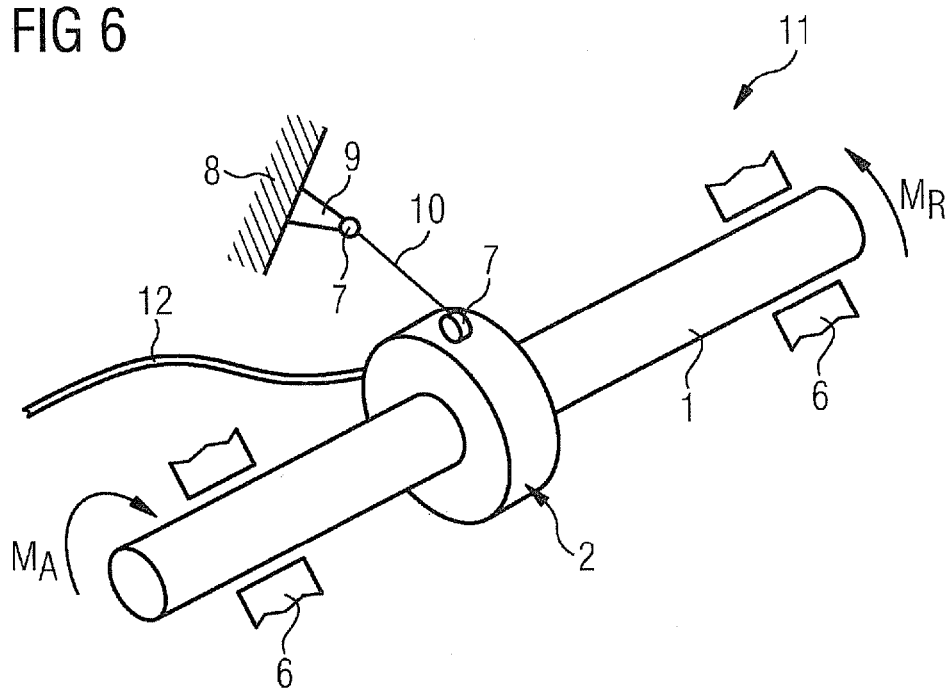
FIG. 6 shows a schematic diagram of the inventive arrangement of the damping system, and
FIG. 7, 8 show a diagram of the curves of the torsion stresses during an overlaid torsion vibration.

FIG. 6 shows a schematic diagram of the inventive arrangement of the damping system 11.

The shaft 1 is rotatably supported in two bearings 6, 6. These bearings can be designed as sliding bearings, ball bearings or roller bearings or similar. A drive torque $M_A$ engages with the shaft 1 in the direction of rotation, against which a drive torque $M_R$ acts as a reaction torque, so that the shaft 1 is subjected to torsion stresses. As a result of the inherent frequency of the mechanical shaft system torsion vibrations arise which form especially strongly in the areas of the shaft 1 close to the surface and cause torsion stresses.

The ferromagnetic material of the shaft, for example a steel alloy, generates magnetostrictive modification of the permeability because of the material compressions. The time-resolved modification of the permeability of the shaft surface material is detected by the magnetoelastically acting torque sensor 5 and is passed to a controller (not shown). The controller can be arranged both outside and also within the holder device 2.

The controller generates a damping signal phase-offset in relation to the detected signal, which is then used as an amplified signal to control the magnetostrictive actuator devices 3 or 4, depending on the direction of rotation of the shaft 1.

A flexible cable 12 has a sufficient length so that the actuator devices 3, 4 and the torque sensor 5 and possibly the controller can be supplied with power and signals can be exchanged via said cable.

In the present embodiment the inventive holder device 2 with actuator devices 3, 4 is not fastened rigidly to the housing 8 of the machine but is flexibly suspended from it.

A transmission element 10 is pivotably connected by 2 universal joints 7, 7 to the holder device 2 and to the anchoring point 9. This gives the holder device 2 in the plane running perpendicular to the axis of rotation of the shaft 1 at least two degrees of freedom of movement.

The transmission element 10 can thus, depending on the direction of rotation of the shaft 1, transfer both torsion and compression forces to the holder device 2 and hold this firmly to stop it turning along with the shaft 1. This type of flexible suspension of the inventive damping system means that the disruptive influences from axial deflections of the shaft 1 on the detection of the torsion vibration and on the generation of phase-offset counter vibrations in the opposite direction from actuator devices are excluded or greatly reduced.

Figure 7:
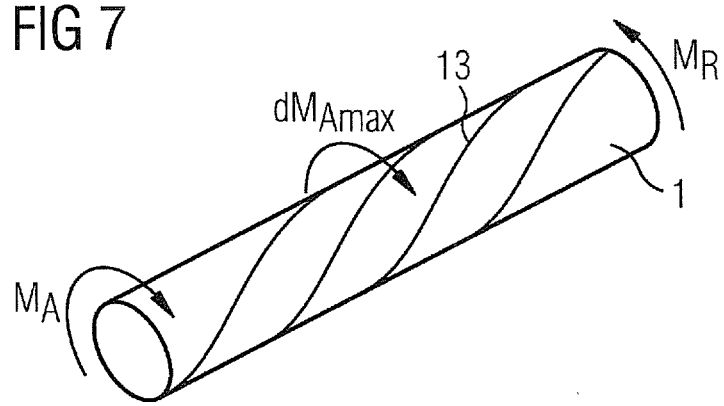
Figure 8:
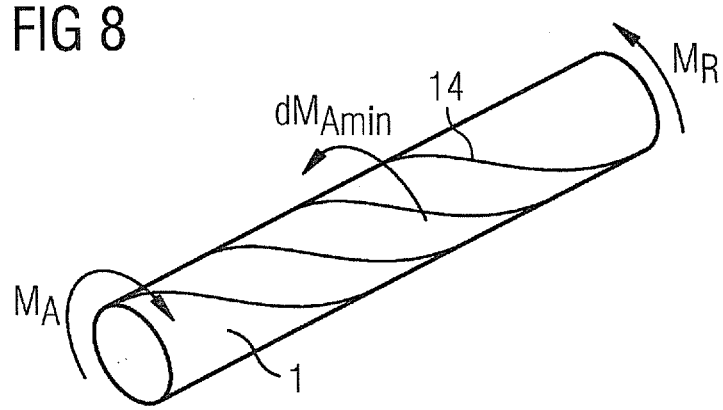

FIGS. 7 and 8 show a diagram of the progress of the torsion vibrations stresses 13, 14 during a torsion vibration overlaid onto the constant torque $M_A$.

In order to clearly illustrate the torsion vibration the shaft 1 can be assumed to be idling, if the shaft 1 now has a rotational vibration or torsion vibration imparted to it over a section of its length by the masses coupled to the shaft for example, the two ends of the shaft 1 turn in opposite directions in relation to one another and vibrate backwards and forwards as a result of the elasticity of the shaft 1.

Caused by the torsion vibration, the direction of rotation of the torsion vibration changes and with it the alignment of the torsion stresses 13 in FIGS. 7 and 14 in FIG. 8 in a complementary manner.

If the shaft 1 is rotating with a constant torque $M_A$ in a direction of rotation indicated by the arrow, the torsion vibration is overlaid onto the torque $M_A$, with the previously described reversal in direction of the torsion vibrations being retained.

The torsion vibrations respectively aligned in a complementary manner correspond in FIG. 7 to the vibration maximum $dM_{Amax}$ shown in FIG. 5, and in FIG. 8 to the vibration minimum $dM_{Amin}$ of the torsion vibration.

With the inventive damping system and method not only can a noise-generating torsion vibration be eliminated, but also torque vibration peaks can be smoothed, which increases the lifetime of the system and as a result enables costs to be reduced.

The inventive elimination of the torsion vibrations also adapts automatically to changed vibration conditions if for example the inherent frequency of the mechanical system changes as a result of connecting or disconnecting sub-mechanisms. On the other hand the inventive damping system exerts no influence or hardly any influence on the inherent torsion frequency of the mechanical system and is characterized by its low weight.

The invention claimed is:

1. A damping system for eliminating torsion vibrations of a shaft of a machine, comprising:
    a torque sensor for detecting torsion vibration;
    a holder device;
    a first magnetostrictive actuator device for generating a mechanical counter-vibration, wherein the first magnetostrictive actuator device comprises at least one electromagnetic coil arranged on the holder device; and
    a control unit which
        detects a measurement signal of the torque sensor in a time-resolved manner,
        generates a phase-offset signal for the counter-vibration, and
        drives the magnetostrictive actuator device,
    wherein the machine comprises a housing, wherein the holder device is
        anchored on the housing or
        arranged on the housing and coupled to an oscillating movement of the shaft caused by imbalance and/or rotation imprecision and/or bearing tolerances and/or torsion.

2. The damping system as claimed in claim 1, wherein a direction in which the first magnetostrictive actuator device acts in relation to an axis of rotation of the shaft is arranged at a predetermined angle of inclination, so that the direction of action of the first magnetostrictive actuator device matches a direction of the torsion stresses in surface areas of the shaft.

3. The damping system as claimed in claim 2,
    wherein the angle of inclination of the direction in which the first actuator device acts lies between 30 and 60 degrees, preferably at 45 degrees, and
    wherein an angle of inclination of the direction in which a second magnetostrictive actuator device acts lies between 255 and 285 degrees, preferably at 270 degrees, in relation to the shaft's axis of rotation.

4. The damping system as claimed in claim 1, wherein the torque sensor and the at least one electromagnetic coil are arranged in a shared holder device surrounding the shaft.

5. The damping system as claimed in claim 1, wherein a plurality of holder devices surround the shaft for generating a multiply-amplified counter-vibration.

6. The damping system as claimed in claim 1, wherein the shaft is a hollow shaft.

7. The damping system as claimed in claim 1, wherein the control unit includes a closed-loop control algorithm.

8. The damping system as claimed in claim 1, wherein the first magnetostrictive actuator device is arranged spaced away from a surface of the shaft with a predetermined gap.

9. The damping system as claimed in claim 1, wherein the first magnetostrictive actuator device is spaced away from neighboring actuator devices by a predetermined spacing such that the actuator devices do not have a disruptive influence on each other.

10. The damping system as claimed in claim 1,
    wherein the first magnetostrictive actuator device comprises a second electromagnetic coil, wherein the first and second coils are each provided for one of the two opposing directions of rotation of the shaft,
    wherein a second magnetostrictive actuator device is provided, wherein directions in which the first and second actuator devices act are essentially perpendicular to each other.

11. The damping system as claimed in claim 10, wherein the first and second electromagnetic coils are arranged crossed above one another in relation to the first and second actuator devices which act in a complementary manner to each other.

12. The damping system as claimed in claim 1, wherein the torque sensor is embodied in accordance with a magnetoelastic principle.

13. A method for eliminating torsion vibrations of a shaft in a machine, comprising:
    providing a torque sensor, a holder device, and a magnetostrictive actuator device with at least one electromagnetic coil arranged on the holder device;
    detecting torsion vibration of a torque of a shaft in a time-resolved manner by the torque sensor;
    generating a phase offset signal for a counter-vibration, and
    generating a mechanical counter vibration by the magnetostrictive actuator device,
    wherein the machine comprises a housing, and wherein the holder device is
        anchored on the housing or arranged on the housing and coupled to an oscillating movement of the shaft caused by imbalance and/or rotation imprecision and/or bearing tolerances and/or torsion.

14. The method as claimed in claim 13,
supplying power to the magnetostrictive actuator device during a vibration maximum of the torsion vibration; and
supplying power to a second actuator device during a vibration minimum.

* * * * *